Feb. 20, 1951     P. FORTESCUE     2,542,499
AUTOMATIC CONTROL FOR GAS TURBINES
Filed Oct. 29, 1946
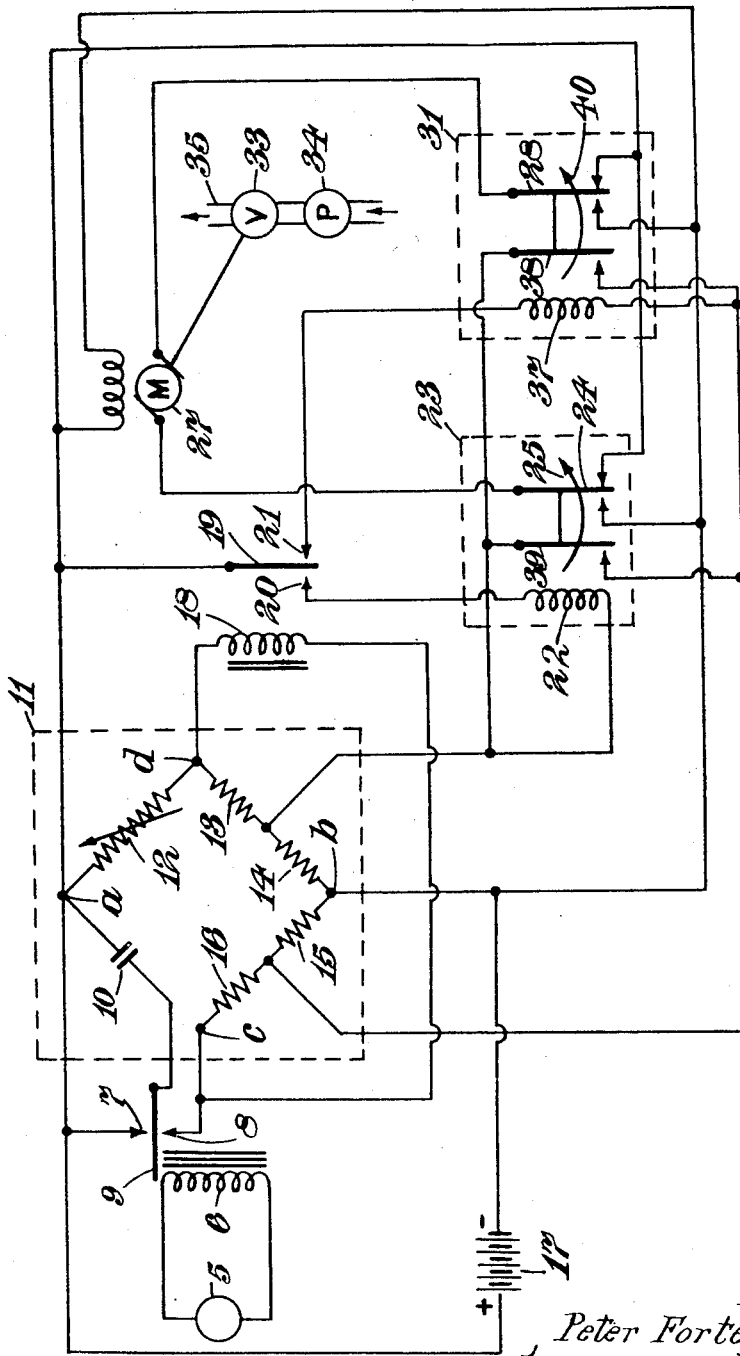
Inventor
Peter Fortescue
by Wilkinson & Mawhinney
Attorneys Patented Feb. 20, 1951

2,542,499

UNITED STATES PATENT OFFICE 2,542,499

AUTOMATIC CONTROL FOR GAS TURBINES

Peter Fortescue, Bristol, England, assignor to The British Aeroplane Company Limited, Bristol, England, a British company Application October 29, 1946, Serial No. 706,317
In Great Britain October 16, 1945

5 Claims. (Cl. 175—355)

1

This invention concerns automatic controls for gas turbines of the kind in which there is generated an electric potential proportional to one or more of the operating variables of the turbine which is or are to be controlled and such potential is balanced against a standard potential indicative of a datum value of said operating variable or variables, the arrangement being that departure of the generated potential from the standard results in the transmission of a signal to the automatic control which is therefore brought into operation to adjust said variable(s) to re-establish the datum value thereof and produce equality between the generated and standard potentials.

It is an object of the present invention to provide an automatic control of the kind referred to in which the transmission of a signal consequent upon the generated and standard potentials becoming out of balance, automatically augments the out of balance condition and thereby increases the strength of the transmitted signal. In this way the control is rendered more sensitive so that the transmitted signal may be satisfactorily detected by mechanical relays instead of the more complicated and costly electronic relays.

According to the present invention an automatic control for gas-turbines of the kind referred to is characterised in that the standard and generated currents are applied to a bridge-network which transmits a signal upon said currents becoming unbalanced, said signal being applied to a sensitive relay which actuates a control relay which in turn regulates the automatic control, the current passing to the control relay upon actuation of the sensitive relay being applied to said bridge-network to increase the unbalanced state of the network until the control relay is actuated, whereupon the initial unbalanced state of the bridge-network is re-established.

Preferably the control relay comprises a coil through which current passes upon actuation of the sensitive relay and a pair of contactors one of which regulates the passage of current to the automatic control and the other which regulates the passage of the current in the control relay to the bridge-network, said coil being connected in series with one arm of the network and said second contactor with the opposite arm thereof.

It is preferred that the control-relay coil and the second contactor be each connected to its associated arm of the network between a pair of series resistances constituting said arm, the ratio of the resistances of one arm being the same as the ratio of the resistances of the other arm.

2

A specific embodiment of the present invention will now be described, by way of example, with reference to the accompanying drawing which diagrammatically shows the invention applied to an automatic control for governing the speed of a gas turbine.

The present invention makes use of a known method for accurately determining the capacity of a condenser which is due to Clark Maxwell. The application of this method to the speed governing of a gas turbine briefly comprises connecting an alternator 5 to a bridge network generally indicated by the reference numeral 11 through a polarized relay 6. The alternator 5 is driven by the gas turbine (not shown). The armature 9 of the relay due to its being energized by the alternator 5 vibrates between contacts 7 and 8.

The network 11 comprises three arms having resistances 12, 13 and 14 and 15 and 16 and a condenser arm having the condenser 10. The input points of the network are shown at $a$ and $b$ and these are connected with the battery 17 whilst the output points are at $c$ and $d$.

When the armature 9 engages the contact 8 the condenser 10 is charged by the battery 17 and when it engages the contact 7 the condenser is discharged.

With this arrangement the frequency with which the condenser 10 is charged and discharged in order to produce balance in the bridge-network 11 (that is, so that there is no potential difference across the output points $c$ and $d$) is arbitrarily determined by the values for the capacity for the condenser 10 and for the resistances 12, 13 and 14 and 15 and 16. By the term "balanced" as applied to the bridge-network is meant the conditions under which the average current in an external circuit connected across the bridge output points $c$ and $d$ would be zero. A relay or other electro-mechanical device possessing sufficient inertia when connected to these points would under these conditions be undeflected. This freqency is that of the alternator 5 and depends on the speed of the gas turbine so that the values of the condenser and resistances may be selected to produce balance of the bridge-network 11 at a predetermined datum speed of the turbine. Whilst this datum speed is maintained by the turbine, the network 11 is balanced and therefore the average potential difference across the output points $c$ and $d$ is zero. The resistance 12 is variable to adjust the datum value of the speed of the turbine at which the network 11 is balanced.

The output points $c$ and $d$ are connected to a relay 18 which controls the flow of current to an electric motor 27. The motor is connected with a throttle valve 33 which is in the fuel supply line 35 to the gas turbine. The fuel is fed along the line 35 by a pump 34.

With the arrangement, whilst the network 11 is balanced the motor 27 is inoperative and valve 33 remains set so that the quantity of fuel passing to the turbine remains constant. When the network 11 becomes unbalanced current passes to the relay 18 and as a consequence the motor 27 is brought into operation to adjust valve 33 and vary the quantity of fuel passing to the turbine. The speed of the latter is thereupon re-set to a datum value corresponding to the state of balance in the network 11.

In a control as above described with reference to the accompanying drawing the output points c and d may be connected to an electro-magnetic relay (such as 18) or to an electronic relay. Because of the reduced cost and simplicity of the apparatus it is preferred to use electro-magnetic relays. With the latter however it is found that the resistance at the contact points is so great that a considerable state of unbalance in the bridge network is required before the motor 27 is brought into operation.

The present invention is directed to increasing automatically the signal strength from the bridge network 11 upon its becoming unbalanced. In this way the current passing to the relay 18 becomes greater and the resistance at the contact points less.

To this end the armature 19 of the relay 18 is capable of engaging either contact 20 or 21. Associated with contact 20 is a control relay generally indicated by the reference numeral 23 and associated with the contact 21 is a control relay 31. The control relay 23 is brought into operation, as hereinafter described, to increase the fuel supply to the gas turbine whilst the control relay 31 is brought into operation to reduce said fuel supply.

From the above it will be appreciated that whilst the network 11 is in a state of balance relay 18 is not energised and armature 19 is in a central position in which it engages neither of contacts 20, 21. When the relay 18 is energised upon a state of unbalance being produced in the network 11 relay 18 is brought into operation followed by control relay 23 or 31. This results in the electric motor 27 being actuated suitably to adjust the fuel valve 33.

Two arms of the bridge network 11 comprise a pair of resistances connected in series, thus, resistances 13 and 14 and 15 and 16. Resistance 14 has a low value compared with resistance 13 and similarly resistance 15 has a low value compared with resistance 16. Furthermore it is arranged that the ratio of the resistances 14 and 13 be the same as the ratio of the resistances 15 and 16.

Contact 20 is connected to one end of coil 22 of the control relay 23 and the other end of the coil is connected to between the resistances 13 and 14. Similarly contact 21 is connected to one end of coil 37 of the control relay 31 the other end of the coil being connected to between the resistances 15 and 16.

Control relay 23 is provided with a pair of contactors 24, 39 which are normally spring urged in the direction of arrow 25 but which are simultaneously moved in the opposite direction when the coil 22 is energised. Similarly control relay 31 is provided with a pair of contactors 28, 38 which are normally spring urged in the direction of arrow 39 but which are moved in the opposite direction when coil 37 is energised.

Contactors 24 and 28 control the passage of current from the battery 17 to the motor 27 whilst contactors 38 and 39 are provided respectively to connect that end of its associated coil 37, 22 with the resistance arm 13, 14 and 15, 16.

With the arrangement described, when the bridge network 11 becomes unbalanced, the average current passing to the relay coil 18 departs from zero. The latter is therefore energised and its armature 19 is moved to engage lightly with contact 20 or 21. Let it be assumed that contact 20 is thus engaged. When this occurs current from battery 17 passes to the armature 19, contact 20, coil 22 and so to the resistance arm 13, 14 and thence back to the battery. The effect of passing the battery current through the resistance 14 to the network 11 is further to upset the balance thereof and in the same sense as that which initiated the operation of the relay 18. By thus augmenting the unbalance of the network, relay 18 is more strongly energised and armature 19 engages contact 20 with increased pressure—a stronger signal is transmitted to the coil 22 of control relay 23. When the signal strength attains a certain value contactors 24, 39 are moved in the opposite direction to arrow 25 that is to the closed position. Thereupon a circuit is completed from the battery 17, the contactor 25, motor 27, contactor 28 and back to the battery. The motor 27 thereupon adjusts valve 33 to control the quantity of fuel passing along pipe 35 to the gas turbine so that the speed of the latter is returned to the datum value. Simultaneously with the closing of contactor 39 coil 22 is connected to between resistances 15 and 16. This has the effect of re-establishing in the network 11 the initial state of unbalance so that the network is once again sensitively responsive to the operating conditions.

Similarly when the relay 18 is energised so that armature 19 engages contact 21, coil 37 will be energised and simultaneously connected to between resistances 15 and 16. The effect of this is further to increase the unbalance of the network 11 so that the relay 18 is further energised and armature 19 engages contact 21 with increased pressure. A stronger signal is therefore transmitted to coil 37 and when this attains a certain value contactors 28, 38 are moved in the opposite direction to the arrow 39. When this occurs a circuit is completed which comprises the battery 27, contactor 28, motor 27, contactor 24 and so back to the battery. The motor 27 therefore operates valve 33 to vary the flow of fuel passing along pipe 35 to the gas turbine so that the speed of the latter is returned to the datum value for which the network 11 has been set. Simultaneously contactor 38 completes a circuit which results in the coil 37 being also connected to between the resistances 13 and 14. This has the effect of re-establishing the initial state of unbalance of the network 11.

Upon motor 27 adjusting the valve 33 the fuel flow will be varied so that the speed of the gas turbine and hence of the alternator 5 is varied. This adjustment will continue until such time as frequency of transmission of the alternator 5 and thus the rate of charge and discharge of the condenser 10, attains a value such that the state of balance of the network 11 is re-established. When this occurs no potential difference exists between the points c and d and relay 18 and either control 23 or 31 is put out of operation. It will thus be seen that upon the relay 18 being energised the network 11 is automatically further unbalanced in a sense to give still greater contact pressure between the armature 19 and contact 20 or 21 so that this pressure will be rapidly built up from a small value until the relay 23 or 31 is brought into operation. Relay 23 or 31 performs the dual function of bringing the fuel-valve motor 27 into operation and re-establishing the initial unbalanced condition of the network 11 so that the relay 18 may perform its normal function.

I claim:

1. Apparatus for automatically controlling a gas-turbine engine in which an operating variable of the engine is electrically controlled comprising a bridge network, means for applying an electrical quantity, proportional to the engine variable, to the network, means for applying a standard electrical quantity representing the datum value which the variable ought to have, said quantities being compared in the network so that an electrical quantity results from said comparison when the network is unbalanced, control means to which said resultant electrical quantity is applied to adjust the engine variable and means actuated by the resultant electrical quantity for increasing the unbalanced state of the network.

2. Apparatus as claimed in claim 1 in which the electrical quantity resulting from unbalance of the bridge network is utilized to complete a circuit incorporating a part of the network and a source of electro-motive force.

3. Apparatus according to claim 2 in which the electrical quantity resulting from unbalance of the network is applied to a sensitive relay that actuates a control relay comprising a pair of switches which are simultaneously operated, one of said switches being provided to connect the source of electro-motive force to the control means and the second switch being provided to connect said source of electro-motive force to the bridge network.

4. Apparatus according to claim 3 wherein the control relay comprises a coil which is connected to one end of a resistance the other end of which is connected with the source of electro-motive force, said resistance forming part of one of the arms of the bridge network.

5. Apparatus as claimed in claim 4 in which the bridge network has a pair of arms between an input point and the output points of the network and each arm comprises a pair of series resistances, the ratio of the resistances of one arm being the same as the ratio of the resistances of the other arm and in which a control relay is connected to each arm the two control relays being actuated, each on unbalance of the network in opposite senses, by a common sensitive relay.

PETER FORTESCUE.

REFERENCES CITED

The following references are of record in the file of this patent:

UNITED STATES PATENTS

| Number | Name | Date |
|---|---|---|
| 1,477,309 | Bradshaw | Dec. 11, 1923 |
| 1,665,857 | Needham | Apr. 10, 1928 |